Sept. 5, 1967 E. FREDKIN 3,339,815
FILM INDEXING METHOD AND APPARATUS FOR
HIGH SPEED FILM READING
Filed Nov. 9, 1965 3 Sheets-Sheet 3

INVENTOR.
EDWARD FREDKIN
BY
Dike, Thompson, Bronstein & Mrosa
ATTORNEYS

United States Patent Office 3,339,815
Patented Sept. 5, 1967

3,339,815
FILM INDEXING METHOD AND APPARATUS FOR HIGH SPEED FILM READING
Edward Fredkin, Natick, Mass., assignor to Information International, Inc., Cambridge, Mass., a corporation of Massachusetts
Filed Nov. 9, 1965, Ser. No. 506,946
10 Claims. (Cl. 226—2)

The present invention relates to improvements in the high-speed automatic reading of and recording on film and the like, and, in one particular aspect, to novel and improved apparatus wherein the indexing of strips of film in electro-optical equipment operated with computers is achieved with high precision by uncomplicated mechanisms which respond directly and reliably to computer command signals and which are well isolated from error-inducing forces.

There are numerous areas, in industry, medicine, and government, for example, where vast quantities of data and information in graphical and pictorial form are amassed very quickly but, in turn, can be processed only relatively slowly and laboriously. In many instances, qualitative analyses of these visual records tend to be unsatisfactory because of such factors as record imperfections, high levels of interference, and observer errors. By way of illustration, although it is found that photographic techniques can be exploited to special advantage in obtaining rather fast and economical records of rapidly-changing displays on cathode ray tube indicators, these motion-picture film records may typically accumulate in enormous lengths in short periods of time, and certain variations in film densities and in the sharpness of developed images may affect the precision with which information can later be extracted from the film. Visual inspection and point-by-point measurement of each of the images on the multitudinous frames of such long photographic records is exceedingly tiresome and costly, and, being dependent upon human eye sensitivities and acuities of perception, the measurements of variable information recorded against variable backgrounds tend to be subjective and seriously unreliable. Some increase in processing speed has been realized through use of semi-automatic plotting devices which detect and register the co-ordinates of successive image points across which an operator has positioned a pair of crosshairs or the like; however, this technique nevertheless remains relatively tedious and, moreover, is imprecise because of its dependence upon unreliable perceptions by human operators. High-speed electronic scanning techniques of the general type employed in television systems have therefore become attractive for purposes of significantly accelerating the reading processes, although one of the attendant difficulties has been that of providing exact automatic coordinations with film under examination. Absenting the achievement of such coordinations with great rapidity, the accuracy and speed capabilities of electronic scanning equipment cannot be exploited to maximum advantage. In accordance with one practice of the type under consideration, visual records (such as films) which are to be examined are scanned optically by the light output of a cathode ray tube which generates very sharply concentrated beams of scanning light which are essential to close investigation of the recorded information, the scanning being programmed within associated digital computer equipment. Light outputs from various portions of a film frame under examination are measured by way of photosensitive devices and are recorded with reference to measurement coordinates which should be accurately related to the positions of the scanning light beam and the positions of the film. Mechanical aspects of precisely orienting a film or other record have posed a major obstacle to the preservation of system accuracies; specifically, the exact correlations of data read from records are found to demand extraordinary precision in the transport mechanisms used to adjust the physical positions of the records relative to the electro-optical read-out elements (i.e., cathode ray tube, lenses, etc.). Heretofore, film transports have been motorized in an effort to advance or reverse a strip of film automatically for fine reading at predetermined sites, but such equipments have required the use of troublesome elements such as clutches, constantly-running motors which tend to introduce deleterious film vibrations during measurements, complicated speed-reversal mechanisms, and complex controls. Moreover, prior motorized transports of the type involving film-drive sprocket pins have been restricted to increments of positive movement equal to sprocket-hole separation distances which, for highly sophisticated precision film-reading, can be an undesirably coarse range of movement. In addition, environmental effects of shock and vibration, as well as other effects which may alter frictional restraints of the film unit, tend to vary the torques which such motors must exert in positioning the film, and thereby render the indexing somewhat uncertain. Further, unless accurate feedback or auxiliary coordinated references are provided, the actual orientations of the film at any time cannot be assumed to be as intended, and the resulting data may not be recorded correctly in relation to the various film sites from which they were derived. In accordance with the present teachings, however, such difficulties are successfully overcome through unique use of doubly-driven film transport apparatus wherein short sections of film proximate to those which are to be scanned are preserved in a mechanically isolated state permitting very precise indexing, and wherein independent but synchronized electrical stepping motors lending themselves to reliable computer control serve to establish both coarse and highly refined indexing of the film at high speed and within minute ranges of movements.

It is one of the objects of the present invention, therefore, to provide unique and improved apparatus for automatic reading of and recording on film and the like wherein precision and reliability are extended significantly through use of a film transport mechanism which isolates critical portions of the film from error-inducing variables.

Another object is to provide computer—programmed electro-optical reading and recording apparatus wherein mechanical transport mechanisms predictably and reliably index mechanically-isolated film or like records under control of computer—actuated stepping motors.

A further object is to provide film-reading apparatus including low-cost and uncomplicated transport mechanisms which are capable of indexing film with high precision and certainty within minute ranges of motion in direct response to computer commands and without necessitating the use of positional feedback or optical references to insure that intended indexing has been accomplished.

Still further, it is an object to provide novel and improved high-speed film-reading apparatus wherein a pair of synchronously-operated electrically-reversible stepping motors respond predictably to direct computer command signals to drive in minute incremental steps two expanses of film, one of which is contained within and in mechanically isolated relationship to the other.

By way of a summary account of practice of this invention in one of its aspects, an elongated strip of film carrying recorded information distinguishable in terms of density is positioned longitudinally by a transport mechanism which orients desired portions of the film for scanning by the light output from points illuminated on the screen of an associated cathode ray tube Photosensitive detectors responding to light transmissions through the film deliver outputs to digital computer equipment which interprets and stores its findings as to intelligence appearing at predetermined coordinates for the scanned points. The programmed scanning, under control of the computer, may at various times require that the film under examination be advanced or moved backwards very accurately in large or very small predetermined steps. For these purposes, the computer need only issue two distinctive electrical outputs, representing commands for forward and backward movement of the film. These electrical outputs excite logic-circuit controllers which synchronously energize a pair of electrical stepping motors into predetermined incremental stepping in one or the opposite angular direction. Each of the two stepping motors is independently connected in mechanical driving relationship to a different spaced pair of film sprockets, and thus serves to rotate two sprockets simultaneously in the same angular directions by the same amounts. One of the pairs of sprockets engages and holds taut a relatively short length of the film having a portion which is so oriented by these sprockets that it lies in the path of the optical scanning beam. The second of the pairs of sprockets engages the film at two positions which are displaced beyond the respective ends of the taut length held by the first pair of sprockets, and, further, the film is bent loosely into a partial loop between the adjacent sprockets at each end of the taut length. The taut length of film is thus highly isolated, physically, from influences which could otherwise tend to affect its movements by the associated stepping motor and pair of drive sprockets, while, at the same time the operation of the other stepping motor may be permitted to be affected by variables which render its drive of the film imperfect.

Although the aspects of this invention which are believed to be novel are set forth in the appended claims, additional details as to preferred practices and as to the further objects, advantages and features thereof may be most readily comprehended through reference to the following description taken in connection with the accompanying drawings, wherein:

FIGURE 1 provides a partly black-diagrammed and partly schematic illustration of an automatic film reader system incorporating the improved transport arrangement;

Figure 1:
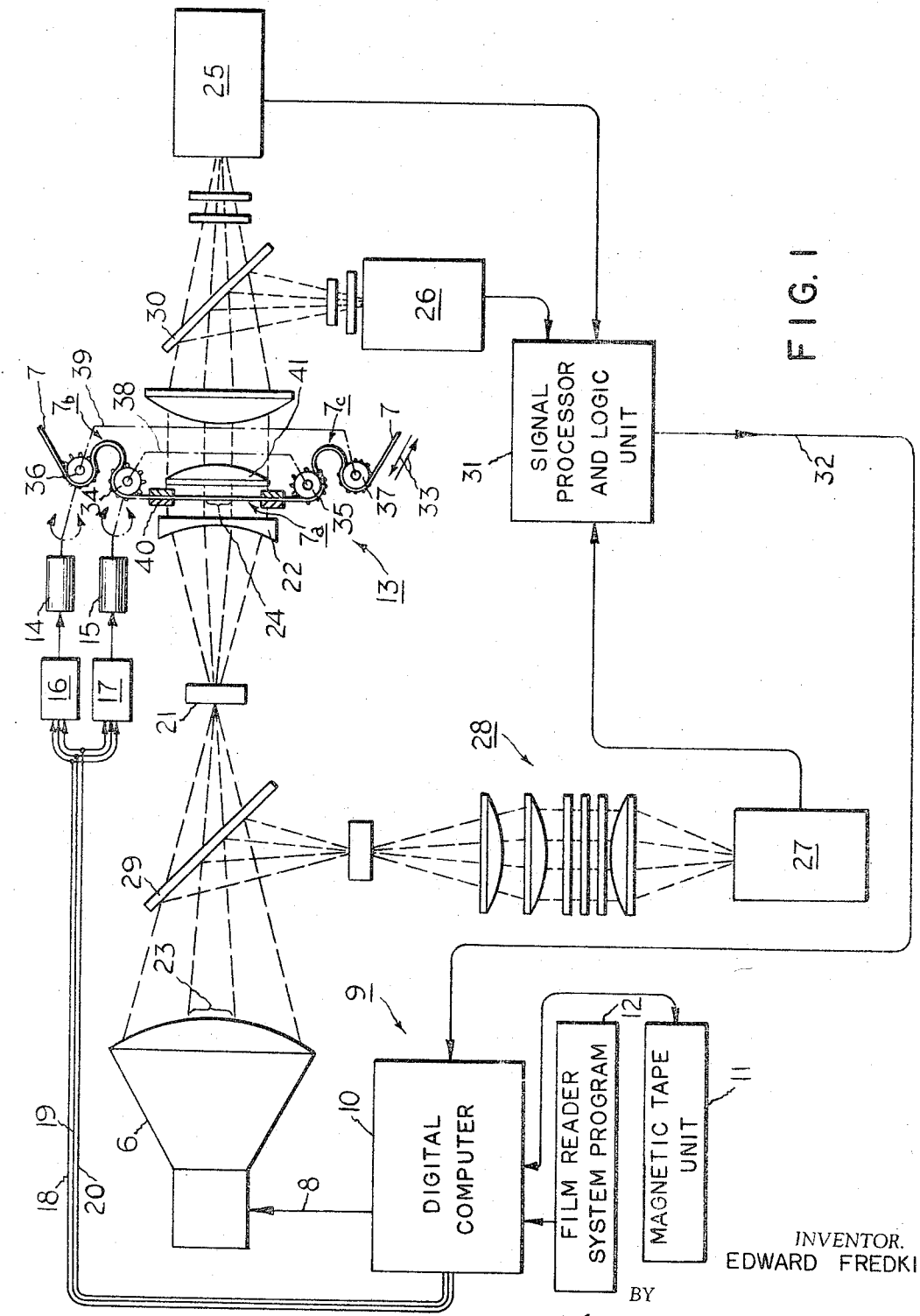

The programmed automatic high-speed film reading system illustrated in FIGURE 1 includes a generally conventional type of cathode ray tube 6 which serves as a source of scanning light which is to impinge upon and scan a record 7, shown as an elongated strip of film, in accordance with programmed signals applied to its deflection elements via coupling path 8 from electronic data processing equipment 9, the latter being shown to include a general purpose digital computer 10 and an associated magnetic tape storage unit 11 and a film reader system program unit 12. The record to be examined is mechanically oriented in relation to the optical array for the scanning light rays by special type of transport mechanism 13, which is described in detail later herein and includes a pair of electrical stepping motors 14 and 15 operated in synchronism by electrical controllers 16 and 17 which respond to computer-originated command pulses appearing in certain ones of excitation leads 18–20. Points illuminated on the face of the cathode ray tube are correspondingly illuminated in the plane of the examined portion 7a of the film, preferably on a reduced scale because of the combined effects of lens 21 and field flattener lens 22. In the arrangement as thus far described, the record may be optically scanned along any or all of the portions 7a lying within the scanning beam limits, by the sharply localized beams of light which are emitted from different points on the face of tube 6 as its phosphor screen is scanned by an electron beam. However, in practice, it is often found that the spot size on the tube screen tends to be "crystal" sharp and of a uniform size only over a relatively small substantially central screen section 23 near the center or optical axis, with the remainder of the screen (about 9 x 9 inches overall) developing a relatively distorted or degraded spot. Whereas previous techniques have involved adjustments producing a fairly average and, hence poorer, quality of spot illumination over substantially the entire raster area, this is not always desirable and, instead, the scanning may advantageously be confined to the limited expanse of the central area near the optical axis of the tube. Concomitantly, the projected sharpspot optical scanning of the film or other record 7 are necessarily restricted to a section 24 of relatively small size, and cannot be expected to embrace the full area of a film record. Typically, a 3 x 3 inch raster section 19 may be optically reduced to an optical film-scanning raster section 24 which is but 0.2 x 0.2 inch in size and includes 4,096 discrete scanning points. Exceptionally high resolutions are thus made available; however, it is highly important that the film be positionable within very close limits to enable coordinated readings of all points.

Depending upon whether the film is a positive or negative, and whether or not light rays from the discrete spots of illumination derived from C.R.T. 6 at any instant encounter an item of intelligence recorded on the film, there may be a transmittal of light output through the film to both of the photomultiplier-tube sensors 25 and 26. At the same time, a reference photomultiplier-tube sensor 27 responds to illumination from screen section 23, and detects only whether or not any defocussed light reaches it through a lens and filter array 28 as the result of reflections from the obliquely-oriented beam-splitting mirror 29. A further beam-splitting mirror 30 serves to excite both the sensors 25 and 26 with the light transmitted through the film. Signals from the photomultiplier-tube sensors 25–27 are applied to a signal processor and logic unit 31 for decoding and translation into related signals which are then delivered to the computer 10 via coupling 32, all in accordance with techniques which need not be reviewed in detail here inasmuch as they are not uniquely related to the specific areas of improvement with which the present invention is concerned. If desired, pertinent details may be found in my copending U.S. patent application S.N. 357,700, filed Apr. 6, 1964. Computer equipment 9 is effective to deliver an electrical pulse output (example: 15-volt pulses) to either the line pair 18–19 or the line pair 19–20 when the film is to be driven forward or backward, respectively, in directions of arrows 33, by a single predetermined and highly precise incremental amount.

Stepping motors 14 and 15, which serve to drive the film, are known types of high-torque motive devices which normally tend to hold themselves in rotor-locked condition and to move in one or the opposite angular direction with high torque but only by minute and discrete angular steps or increments when their stator windings are energized strictly in accordance with a predetermined switching sequence. One convenient embodiment of such a stepping device comprises a permanent magnet type motor in which cooperating toothed rotor and stator elements proportioned such that they tend to remain angularly locked substantially free of vibration in whatever angular relationship they are indexed at any time; changes in the pattern of excitations for the polyphase stator windings of the motor are effective to develop a high-torque angular "step" movement of the rotor, to another locked position, in one or the other angular direction, only if the changes are in a predetermined sequence. Known forms of logic circuits, such as circuits 16 and 17, serve to control the changes in excitations of the stator windings such that each step of a predetermine incremental angular amount will occur in one direction in both stepping motors when a computer command pulse is impressed upon these circuits via lead 18–19 and in the opposite direction when impressed upon them via leads 19–20. In an alternative construction, the separate circuits 16 and 17 may be consolidated into a single controller unit for driving both of the stepping motors.

Despite the fact that the reversible stepping motors are relatively high-torque devices, their film-driving operations can be influenced sufficiently by ambient environmental effects of shock or vibration, or by variations in friction and load distribution and torques of associated film reels and guides, such that they would ordinarily be subject to significant error in positioning the film 7. However, such difficulties are successfully overcome by the unique double-drive and film-looping structure involving the two pairs of sprockets 34–35 and 36–37. Considered in relation to the path of a continuous strip of film, with which they are used such as the illustrated strip 7, one of the sprocket pairs, 34–35, lies within the span of the other sprocket pair, 36–37, and is effective to drive a relatively small portion, 7a, of the film substantially independently of the drive by sprockets 36–37. Mechanical couplings characterized by dashed linework 38 and 39 serve to connect the stepping motors 15 and 16, respectively, in driving relationship to both sprockets of each of the film-drive sprocket pairs 34–35 and 36–37, respectively. Common toothed-type film sprockets may be used, for example. Importantly, the film section 7a including the portion undergoing optical evaluation at any time, is drawn straight and in a predetermined somewhat taut relationship between the inner sprockets 34–35. Except for relatively small frictional restraints of these sprockets and a guide mechanism 40 which orients the film in relation to the condenser lens 41 that straight-section of film is "floated" or isolated in relation to other restraints and forces which may be exerted on the remainder of the film. For these purposes, the film 7 is caused to be loosely stored dynamically in the form of partial loops, 7b and 7c, between the synchronously-operated normally-locked sprockets 36–34 and 35–37, respectively. The slack occurring in these loops affords the desired isolations at both ends of the critical film section between inner sprockets 34–35, for both forward and reverse directions of stepping movements.

Figure 2:
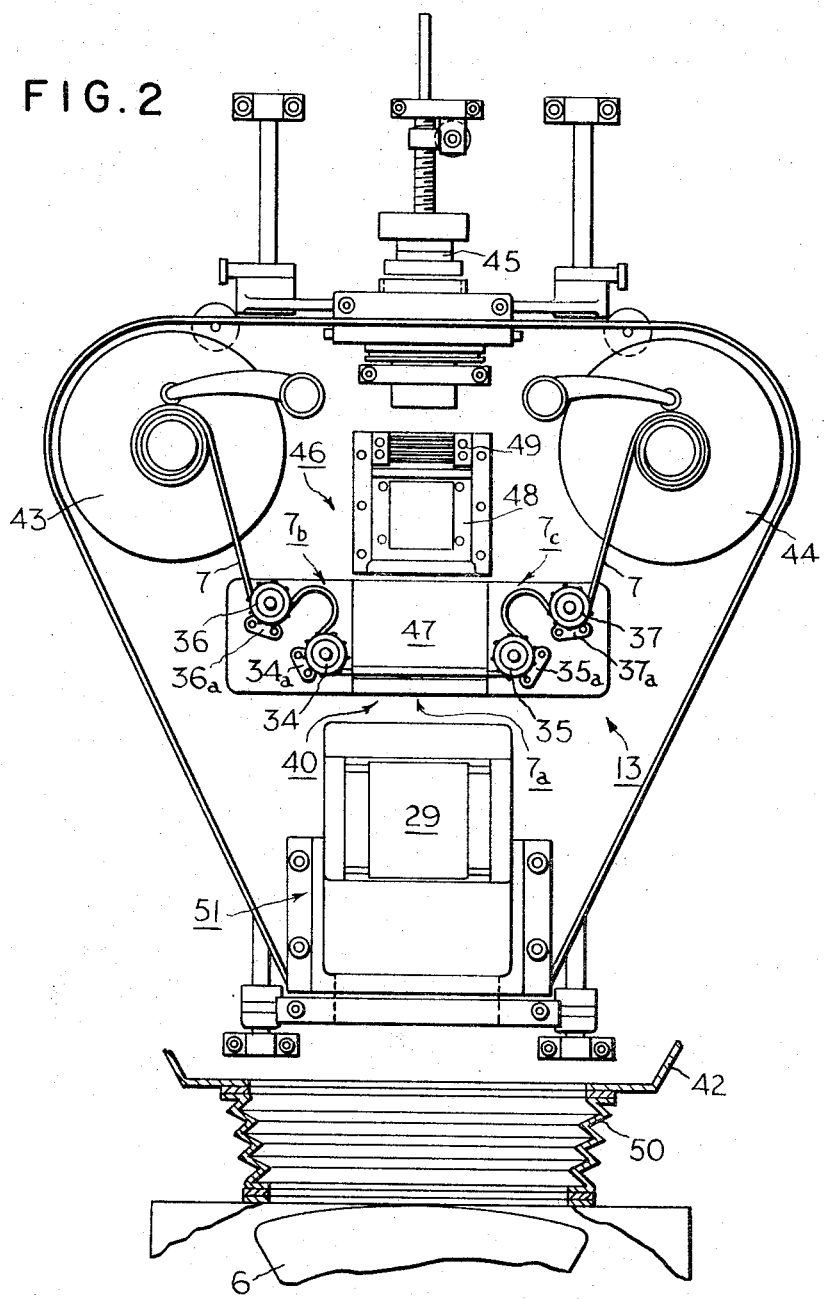
FIGURE 2 is a plan view of an improved optical-mechanical unit for the programmed scanning of film transported by an improved mechanism actuated by a pair of stepping motors.

The FIGURE 2 plan view illustrates constructional features of an embodiment of the improved transport mechanism in an optical film-reading assembly having the surrounding light-tight cover 42 broken away to expose structural details. Film 7 is carried by a pair of reels 43 and 44 and presents selected portions therefrom at the reading site 7a, as dictated by the computer-controlled film-transport mechanism 13. Phototube 45 is shown to be adjustably supported in position to intercept the light beams passing through film 7; intermediate these elements there is disposed an optical sub-assembly 46 in which the condenser lens 41 is held by mount 47, dichroic mirror 30 is fixed on bracketing 48, and filters are mounted in a holder 49. Scanning beams from the face of programmed light source 6 are brought to the film through the light-tight flexible bellows 50 and through a sub-assembly 51 which includes the beam-splitting mirror 29. By virtue of the dynamic storage loops 7b and 7c, drive of the section of film drawn before the scanning beam between sprockets 34–35 is rendered highly immune to the forces exerted on the remainder of the film, such as those portions collected on the reels 43 and 44; the latter restraints are variable with amounts of film which are present on the two reels, for example.

Figure 3:
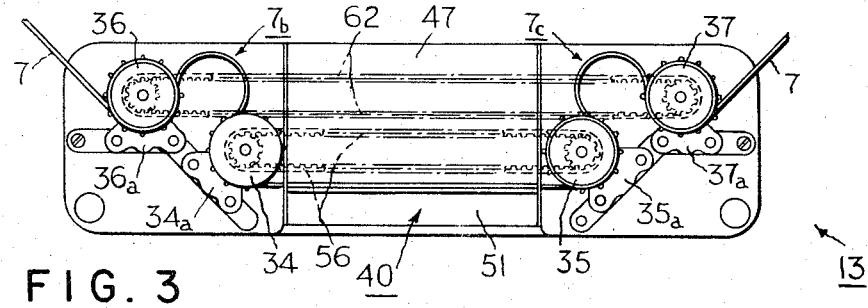
FIGURE 3 is an enlarged plan view of the film-transport mechanism shown in the FIGURE 2 system.
Figure 4:
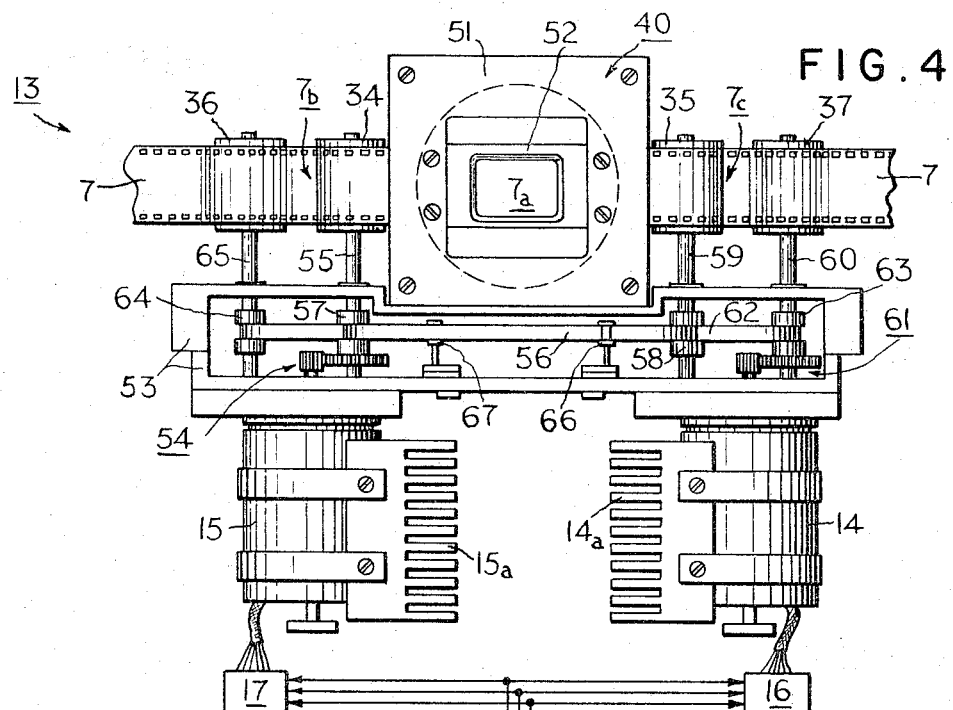
FIGURE 4 illustrates the same film-transport mechanism from the front.
Figure 5:
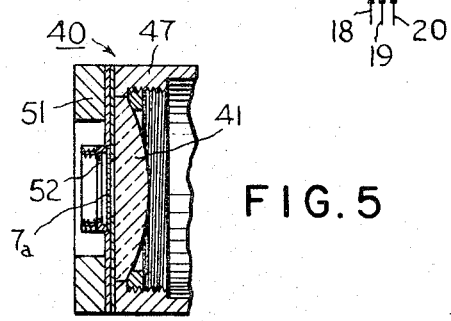
FIGURE 5 is a transverse cross-section of the film-transport mechanism taken along section lines 5—5 in FIGURE 4.

In FIGURES 3 through 5, details of one preferred embodiment of the film-transport mechanism are presented. For purposes of preserving the dynamic storage loops 7b and 7c, each of the sprockets 34–37 has associated with it a curved film-guiding shoe (34a–37a, respectively) disposed (in FIGURES 2 and 3) to prevent separation of the film from the pre-set engagements with the sprockets. The film portion 7a which is to be examined passes through guide mechanism 40 which holds it firmly but gently in a predetermined relationship to the first condenser lens 41; for this purpose, the lens mount 47 has a transverse front passage through which the film may pass beneath the apertured front cover plate 51 while it is held against the front of the mount by a spring-biased apertured pressure plate 52 forming part of the front plate asesmbly. As appears from the view in FIGURE 4, the two stepping motors 14 and 15 are conveniently disposed below the frame 53 supporting the sprockets and film mount assembly. Finned heat-sinks 14a and 15a aid in dissipating excess thermal energy from the continuously-excited but substantially vibrationless motors. Gearing 54 establishes a driving relationship between the rotor of stepping motor 15 and the shaft 55 on which inner sprocket 34 is fixed, and a substantially non-resilient but flexible belt 56 (of material such as a filled Dacron) which is toothed or cogged on its inner periphery is engaged with correspondingly-toothed gears 57 and 58 respectively fixed with shaft 55 and the shaft 59 which mounts the other inner film sprocket 35. Similarly, stepping motor 14 drives shaft 60 for outer sprocket 37 via gearing 61, and cogged belt 62 is engaged with correspondingly-toothed gears 63 and 64 on shaft 60 and the shaft 65 for the other outer sprocket 36, respectively. Accordingly, both inner film-drive sprockets 34–35 and both outer sprockets 36–37 are either moved angularly or held locked in strict synchronism. Tensioning idlers 66 and 67 may also be used to keep the belts 56 and 62 taut. The use of simple low-cost film sprockets, in contradistinction to prior complex cammed pin drive mechanisms thought necessary to realize accuracy, is highly advantageous in that different sizes of film are readily accommodated through changes in sprockets and film guide elements.

The apparatus and practices described are susceptible of modification and adaptation in numerous ways, as will be appreciated by those skilled in the art. By way of example, the stepping motor controller or controllers may respond to distinctively-coded pulses, rather than pulses appearing in different input leads, and gearing or the like may be used in lieu of the preferred belting to provide drive synchronism between the sprocket pairs. It should thus be understood that the detailed descriptions and illustrations here presented are offered for purposes of disclosure, rather than limitation, and that various modifications, substitutions and combinations may be effected within the sprit of these teachings without departing from the invention in its broader aspects as defined in the appended claims.

What I claim as new and desire to secure by Letters Patent of the United States is:

1. In apparatus for the scanning of an elongated record medium such as film or the like at a predetermined site, a precision transport mechanism for indexing the positions of the record medium in relation to the said site comprising reversible electrical stepping motor means, means for connecting said stepping motor means in linear driving and holding relationships to the said elongated record medium at spaced positions in relation to an intended path of movement of the record medium on opposite sides of the said site, and means for electrically exciting said stepping motor means and controlling predetermined incremental angular movements thereof and attendant predetermined incremental linear movements of the said record medium in accordance with electrical command signals from the scanning apparatus.

2. In apparatus for the scanning of an elongated record medium as set forth in claim 1, precision transport mechanism wherein said motor means comprises at least a pair of reversible electrical stepping motors, and wherein said connecting means comprises means connecting one of said stepping motors in driving and holding relationship to the said record medium at two spaced positions on opposite sides of the said site, means connecting the other of said stepping motors in driving and holding relationship to the said record medium at two spaced positions on opposite sides of the said site which span the first-mentioned spaced positions in relation to the intended path of movement of the record medium, and wherein said means for electrically exciting said stepping motor means excites both of said stepping motors to turn synchronously and in the same direction.

3. In apparatus for the scanning of an elongated record medium as set forth in claim 2, precision transport mechanism wherein each of said connecting means includes a pair of film-drive sprockets disposed one each at said positions associated with the respective ones of said connecting means.

4. In apparatus for the scanning of an elongated record medium as set forth in claim 3, said precision transport mechanism further comprising means for holding the record medium in engagement with said sprockets with a substantially loose length of the record medium disposed between each of two adjacent ones of said sprockets on each of the opposite sides of the said site.

5. In apparatus for the scanning of an elongated record medium as set forth in claim 4, precision transport mechanism wherein said holding means form a loop of the record medium between each of the said adjacent ones of said sprockets.

6. In apparatus for the scanning of an elongated record medium as set forth in claim 4, precision transport mechanism wherein each of said connecting means includes a cogged belt engaged in driving and holding relationship with a different pair of said film-drive sprockets on opposite sides of the said site.

7. A film transport for use in an optical scanning system or the like having a scanning site across which the film is to be drawn and indexed for scanning, comprising reversible electrical stepping motor means, means for connecting said stepping motor means in linear driving and holding relationships to an elongated film at spaced positions in relation to an intended path of movement of the film on opposite sides of the said site, means for holding the film substantially taut between a first pair of spaced positions on opposite sides of the said site, means for holding the film in a relatively slack condition between each of said pair of spaced positions and each of a different pair of spaced positions adjacent to said first-mentioned positions, and means for electrically exciting said stepping motor means and controlling predetermined incremental angular movements thereof and attendant predetermined incremental linear movements of the film in accordance with electrical command pulses.

8. A film transport as set forth in claim 7 wherein said stepping motor means includes a pair of reversible electrical stepping motors, wherein said connecting and holding means includes two pairs of film sprockets, means mounting each of the two sprockets of one of said pairs of sprockets on opposite sides of the said site, means angularly interconnecting said two sprockets with each other and with one of said stepping motors, means mounting each of the two sprockets of the other of said pairs of sprockets on opposite sides of the said side at positions which span the positions of said first-mentioned pair of sprockets in relation to the intended path of movement of the film, and means angularly interconnecting said sprockets of said other pair of sprockets with each other and with the other of said stepping motors, wherein said means for electrically exciting said stepping motor means excites both of said stepping motors to turn synchronously and in the same direction, and wherein said pairs of sprockets move the film linearly by substantially the same incremental amounts in the same direction in response to each incremental angular movement of said stepping motors.

9. A film transport as set forth in claim 8 wherein said means for holding the film in a relatively slack condition holds the film in substantially the form of a loop between said positions, whereby the taut length of the film is substantially isolated from the film in the loops and beyond the loops.

10. The method of transporting elongated film across a predetermined site for scanning or the like which comprises engaging and holding a portion of the film substantially taut between each of a pair of spaced positions on opposite sides of the site, further engaging and holding the film at each of a pair of spaced positions on opposite sides of the site which span the first-mentioned spaced positions in relation to the intended path of movements of the film, forming a slack loop of the film between each of the positions on each side of the site, independently moving the taut portion of film synchronously and by equal incremental amounts at each of the first-mentioned pair of positions, and independently, but synchronously with the movements of the taut portion, moving the film synchronously and by equal incremental amounts at each of the second-mentioned pair of positions.

References Cited

UNITED STATES PATENTS 3,045,884    7/1962    Buhrendorf      226—50
3,049,598    8/1962    Lannan et al.    226—43 X M. HENSON WOOD JR., *Primary Examiner.*

A. N. KNOWLES, *Assistant Examiner.*